(12) United States Patent
Yamada (10) Patent No.: US 11,971,918 B2
(45) Date of Patent: Apr. 30, 2024

(54) SELECTIVELY TAGGING WORDS BASED ON POSITIONAL RELATIONSHIP

(71) Applicant: Nippon Telegraph and Telephone Corporation, Tokyo (JP)

(72) Inventor: Takeshi Yamada, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 459 days.

(21) Appl. No.: 17/288,129

(22) PCT Filed: Oct. 18, 2019

(86) PCT No.: PCT/JP2019/041114
§ 371 (c)(1),
(2) Date: Apr. 23, 2021

(87) PCT Pub. No.: WO2020/095655
PCT Pub. Date: May 14, 2020

(65) Prior Publication Data
US 2021/0383057 A1 Dec. 9, 2021

(30) Foreign Application Priority Data
Nov. 5, 2018 (JP) ................................ 2018-208357

(51) Int. Cl.
*G06F 16/383* (2019.01)
*G06F 18/214* (2023.01)
(Continued)

(52) U.S. Cl.
CPC .......... *G06F 16/383* (2019.01); *G06F 18/214* (2023.01); *G06F 40/117* (2020.01);
(Continued)

(58) Field of Classification Search
CPC .... G06F 16/383; G06F 18/214; G06F 40/117; G06F 40/268; G06F 40/284;
(Continued)

(56) References Cited

U.S. PATENT DOCUMENTS

| | | | | |
|---|---|---|---|---|
| 11,783,252 B1* | 10/2023 | Edwards | ............... | G06F 40/284 |
| | | | | 705/7.25 |
| 11,790,018 B1* | 10/2023 | Donnell | .............. | G06F 16/9532 |
| | | | | 707/797 |
| 2002/0078091 A1* | 6/2002 | Vu | ........................ | G06F 16/345 |
| | | | | 707/E17.09 |
| 2006/0282442 A1* | 12/2006 | Lennon | ................... | G06F 16/93 |

(Continued)

FOREIGN PATENT DOCUMENTS

| JP | 2002-258884 | 9/2002 |
|---|---|---|
| JP | WO 2006/137516 | 12/2006 |

(Continued)

*Primary Examiner* — Michael N Opsasnick
(74) *Attorney, Agent, or Firm* — Fish & Richardson P.C.

(57) ABSTRACT

A calculation unit (15a) calculates a degree of association between words included in compound word candidates that are each constituted by consecutive words in a document. The calculation unit (15a) calculates the degree of association by using a conditional probability that is a probability of a word that precedes a last word being present in the document under the condition that the last word follows. A selection unit (15b) selects, as a compound word, a compound word candidate whose degree of association thus calculated is higher than a predetermined threshold value. A learning unit (15c) learns a positional relationship between words that include the selected compound word in the document and predetermined tags added to the document. An addition unit (15d) adds the predetermined tags to the document based on the positional relationship between words that include the learned compound word in the document and the predetermined tags added to the document.

6 Claims, 8 Drawing Sheets

(51) Int. Cl.
  *G06F 40/117*  (2020.01)
  *G06F 40/268*  (2020.01)
  *G06F 40/284*  (2020.01)
  *G06N 20/00*  (2019.01)
  *G06V 30/414*  (2022.01)

(52) U.S. Cl.
  CPC .......... *G06F 40/268* (2020.01); *G06F 40/284* (2020.01); *G06N 20/00* (2019.01); *G06V 30/414* (2022.01)

(58) Field of Classification Search
  CPC .. G06F 2218/08; G06F 40/289; G06F 40/216; G06F 2218/12; G06N 20/00; G06N 7/01; G06V 30/414
  See application file for complete search history.

(56) References Cited

U.S. PATENT DOCUMENTS

| | | | | |
|---|---|---|---|---|
| 2008/0300857 | A1* | 12/2008 | Barbaiani | G06F 40/45 704/4 |
| 2013/0030787 | A1* | 1/2013 | Cancedda | G06F 40/44 704/2 |
| 2015/0106704 | A1* | 4/2015 | Towle | G09B 7/04 715/271 |
| 2018/0032606 | A1* | 2/2018 | Tolman | G06F 16/93 |
| 2023/0297963 | A1* | 9/2023 | Stewart | G06Q 10/1053 705/321 |
| 2023/0409932 | A1* | 12/2023 | Neumann | G06N 20/00 |

FOREIGN PATENT DOCUMENTS

| | | |
|---|---|---|
| JP | 2013-174995 | 9/2013 |
| JP | 2018-18373 | 2/2018 |

* cited by examiner

SĀBISUKANYŪSYA NO HAKKOZI, SĀBĀ NI SETUZOKU DEKINAKATTA BĀI NI WA BANGŌ NO HENKAN GA ...

⬆ MORPHOLOGICAL ANALYSIS

| SĀBISU | NOUN | VERBAL |
| KANYŪ | NOUN | VERBAL |
| SYA | NOUN | SUFFIX |
| NO | PARTICLE | ADNOMINALIZER |
| HATU | NOUN | GENERAL |
| KO | NOUN | GENERAL |
| ZI | NOUN | SUFFIX |
| , | SYMBOL | COMMA |
| SĀBĀ | NOUN | GENERAL |
| NI | PARTICLE | CASE |
| SETUZOKU | NOUN | VERBAL |
| DEKI | VERB | MAIN |
| NAKAT | AUXILIARY VERB | |
| TA | AUXILIARY VERB | |
| BĀI | NOUN | ADVERBIAL |
| NI | PARTICLE | CASE |
| WA | PARTICLE | DEPENDENCY |

SELECTIVELY TAGGING WORDS BASED ON POSITIONAL RELATIONSHIP

CROSS-REFERENCE TO RELATED APPLICATIONS

This application is a National Stage application under 35 U.S.C. § 371 of International Application No. PCT/JP2019/041114, having an International Filing Date of Oct. 18, 2019, which claims priority to Japanese Application Serial No. 2018-208357, filed on Nov. 5, 2018. The disclosure of the prior application is considered part of the disclosure of this application, and is incorporated in its entirety into this application.

TECHNICAL FIELD

The present invention relates to a selection apparatus and a selection method.

BACKGROUND ART

In recent years, a technique for automatically extracting test items corresponding to development requirements from a document such as a design document written by a non-engineer using a natural language has been studied (see PTL 1). This technique adds tags to important description portions in a design document, using a machine learning method (CRF: Conditional Random Fields), for example, and automatically extracts test items from the tagged portions. In machine learning, a document is decomposed into words through morphological analysis, and a tagging tendency is learned based on the positions and types of tags, words before and after each tag, context, and so on.

CITATION LIST

Patent Literature

[PTL 1] Japanese Patent Application Publication No. 2018-018373

SUMMARY OF THE INVENTION

Technical Problem

However, with the conventional technique, it may be difficult to appropriately add tags to a document. For example, when a document is decomposed into words, a compound word into which a plurality of words such as nouns are combined to form a meaning is also decomposed into words. Therefore, it is not possible to perform machine learning using compound words, and the accuracy of the result of learning may be low. Accordingly, a large number of mismatches may occur between the test items automatically extracted using the result of learning and the test items extracted in the actual development.

The present invention has been made in view of the foregoing and an object thereof is to appropriately add tags to a document using appropriate compound words.

Means for Solving the Problem

To solve the above-described problem and achieves the aim, a selection apparatus according to the present invention includes: a calculation unit that calculates a degree of association between words included in compound word candidates that are each constituted by consecutive words in a document; a selection unit that selects, as a compound word, a compound word candidate whose degree of association thus calculated is higher than a predetermined threshold value; a learning unit that learns a positional relationship between words that include the selected compound word in the document and predetermined tags added to the document; and an addition unit that adds the tags to the document based on the positional relationship thus learned.

Effects of the Invention

The present invention makes it possible to appropriately add tags to a document, using appropriate compound words.

DESCRIPTION OF EMBODIMENTS

Hereinafter, an embodiment of the present invention will be described in detail with reference to the drawings. Note that the present invention is not limited to the embodiment. Also note that the same parts in the drawings are indicated by the same reference numerals.

[Outline of Processing Performed by Selection Apparatus]

Figure 1:
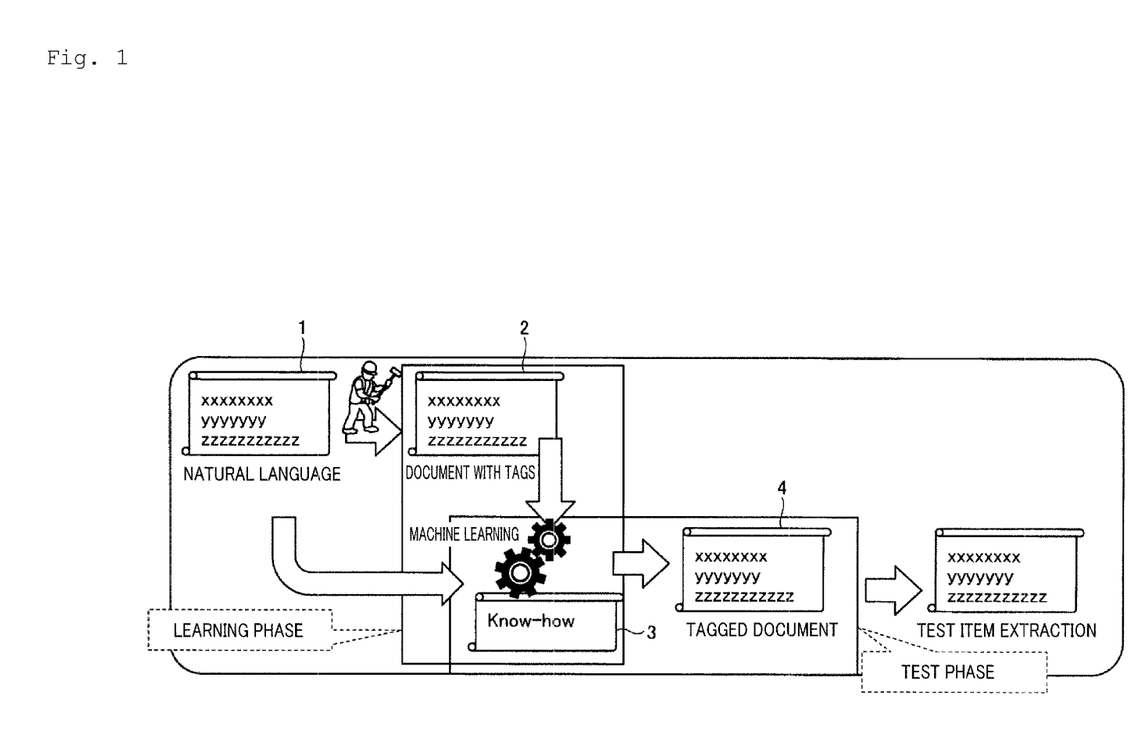
FIG. 1 is a diagram illustrating an outline of processing performed by a selection apparatus according to the embodiment.
Figure 2:
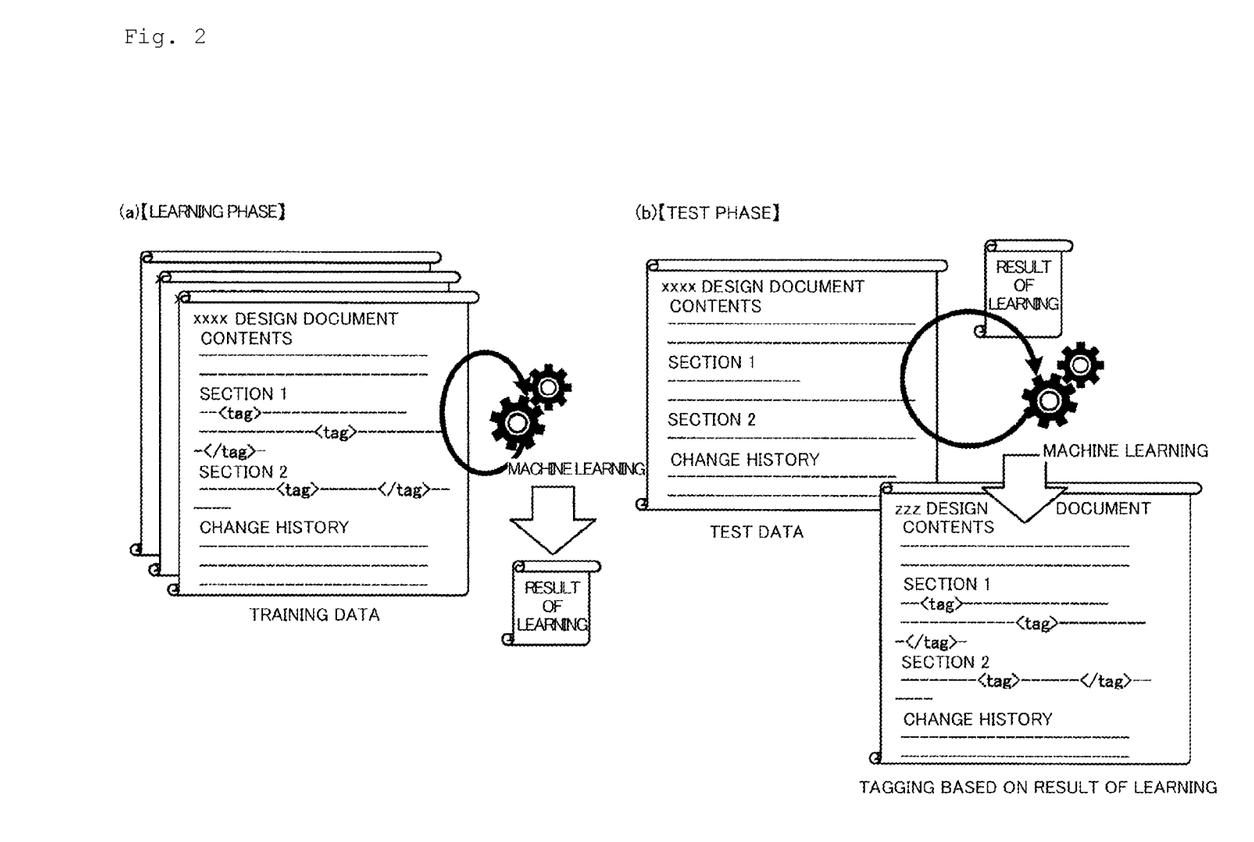
FIG. 2 is a diagram illustrating the outline of processing performed by the selection apparatus according to the embodiment.
Figure 3:
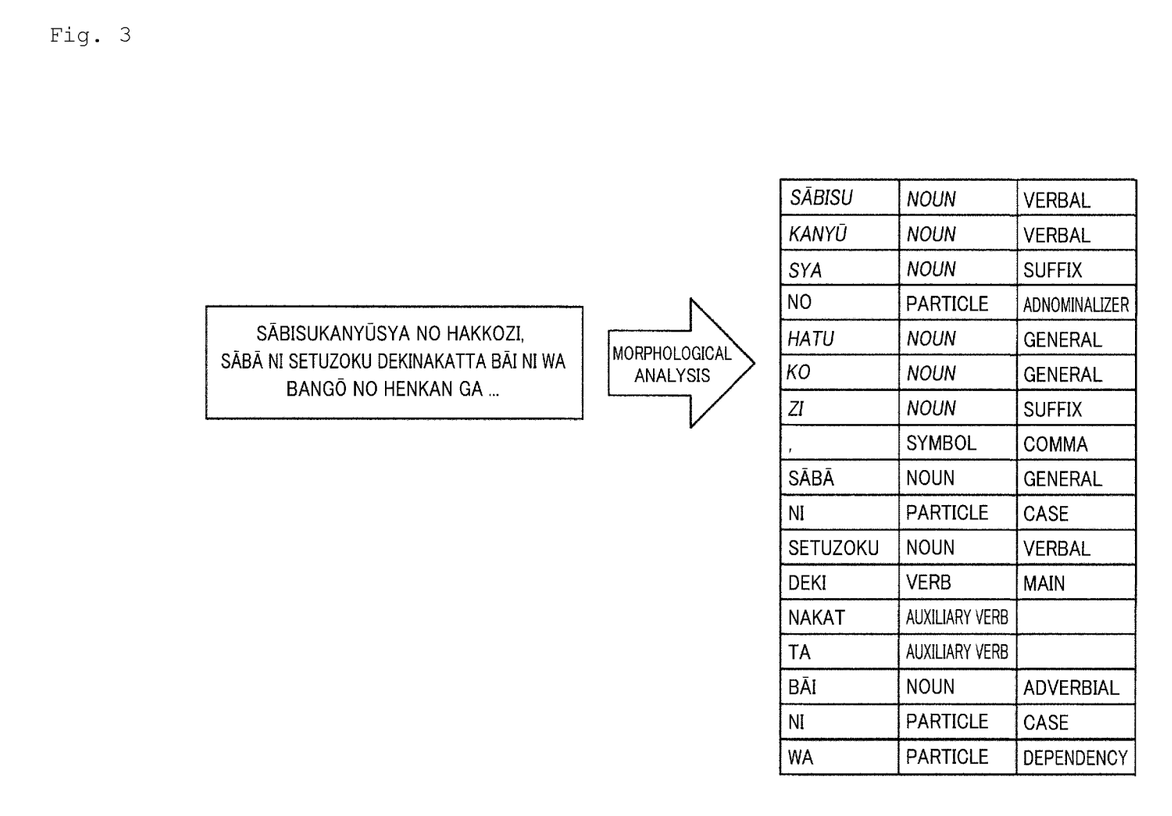
FIG. 3 is a diagram illustrating an outline of processing performed by the selection apparatus according to the embodiment.

FIGS. 1 to 3 are diagrams illustrating an outline of processing performed by a selection apparatus according to the embodiment. First, as shown in FIG. 1, the selection apparatus processes a document 1, which is, for example, a design document written in a natural language. In a learning phase, the selection apparatus performs machine learning, using a tagged document 2, in which tags have been manually added to important descriptions that indicate develop requirements or the like in the document 1, as training data, to learn the positions of tags in the document 1, and obtain a learning result 3.

In a test phase, the selection apparatus adds tags to appropriate positions in the document 1 that is to be subjected to test item extraction processing performed to extract test items, using the learning result 3 obtained in the learning phase, and thus obtains a tagged document 4. Thereafter, the selection apparatus automatically extracts test items from portions indicated by the tags in the tagged document 4.

Specifically, as shown in FIG. 2(a), in the learning phase, the selection apparatus uses training data in which tags have been added to important description portions, as input information, to learn a tagging tendency in the training data by performing probabilistic calculations, and outputs the tendency as the result of learning. For example, the selection apparatus decomposes a document into words through morphological analysis, and learns a tagging tendency based on the positions and types of the tags, words before and after each tag, context, and so on.

Also, as shown in FIG. 2(b), in the test phase, the selection apparatus adds tags to the test data, which is a document that is to be subjected to test item extraction processing, using the result of learning indicating the tagging tendency in the training data, obtained in the learning phase. For example, selection apparatus adds a predetermined tag to description portions that indicate requirements of the test data, indicating that requirements are described therein.

In the above-described learning phase, when decomposing a document into words, if the selection apparatus also decomposes a compound word into which a plurality of words are combined to form a meaning, machine learning cannot be performed using compound words, and accuracy in learning may be low.

For example, FIG. 3 shows an example in which a text "sābisukanyūsya no hakkozi, sābā ni setuzoku dekinakatta bāi ni wa bangō no henkan ga . . . " written in a natural language is decomposed into words through morphological analysis.

From this text, words "sābisu", "kanyū", and "sya" are generated as a result of decomposition, as shown in italics in the figure, for example. As a result, the selection apparatus cannot perform machine learning using the compound noun "sābisukanyūsya". Similarly, from this text, words "hatu", "ko", and "zi" are generated as a result of decomposition. As a result, the selection apparatus cannot perform machine learning using the compound noun "hakko" or "hakkozi".

However, in a design document, for example, if compound words such as "sābisukanyūsya" and "hakkozi" are used as clues, it is possible to accurately specify description portions that indicate requirements. Therefore, as a result of the selection apparatus performing machine learning using such compound words, it is possible to improve accuracy in learning in which tags indicating that requirements are described are added to description portions that indicate the requirements of a design document, for example.

Therefore, the selection apparatus according to the embodiment selects compound words from training data and uses them for machine learning in the learning phase in order to obtain an appropriate result of learning in the test phase. As a result, the selection apparatus can accurately specify description portions to which tags are to be added to a document, and, and therefore the selection apparatus can accurately perform learning regarding tagging to the specified description portions.

Also, in the test phase, the selection apparatus selects compound words from test data, specifies description portions to which the tags of the test data are to be added, using the compound words, according to the result of learning in the learning phase, and adds predetermined tags to the specified description portions.

Thus, for example, the selection apparatus can accurately specify the description portions indicating the requirements of the design document, which is the test data, by using the compound words, and accurately add the predetermined tags, which indicate that the requirements are described, to the specified description portions. As a result, the selection apparatus can appropriately extract test items from portions indicated by the tags of the test data in which the tags are added to appropriate portions.

In this way, the selection apparatus can accurately learn the positions to which tags are added, using appropriate compound words. Also, the selection apparatus adds tags to appropriate positions in test data according to the result of learning. As a result, the selection apparatus can appropriately extract test items from the test data.

[Configuration of Selection Apparatus]

Figure 4:
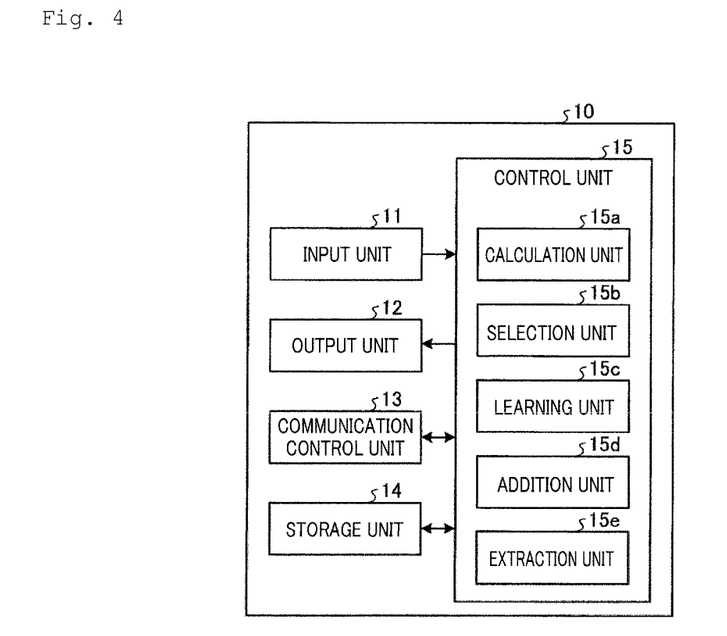
FIG. 4 is a schematic diagram illustrating a schematic configuration of the selection apparatus according to the embodiment.

FIG. 4 is a schematic diagram illustrating a schematic configuration of the selection apparatus according to the embodiment. As illustrated in FIG. 4, the selection apparatus 10 is realized using a general-purpose computer such as a personal computer, and includes an input unit 11, an output unit 12, a communication control unit 13, a storage unit 14, and a control unit 15.

The input unit 11 is realized using an input device such as a keyboard or a mouse, and inputs various kinds of instruction information such as an instruction to start processing to the control unit 15 in response to an operation input by an operator. The output unit 12 is realized using a display device such as a liquid crystal display or a printing device such as a printer, for example.

The communication control unit 13 is realized using a NIC (Network Interface Card) or the like, and controls communication between an external device and the control unit 15 via a telecommunication line such as a LAN (Local Area Network) or the Internet. For example, the communication control unit 13 controls communication between a management apparatus that manages documents that are to be used in selection processing described below, and the control unit 15.

The storage unit 14 is realized using a semiconductor memory device such as a RAM (Random Access Memory) or a flash memory (Flash Memory), or a storage device such as a hard disk or an optical disc. For example, the storage unit 14 stores the result of learning that indicates the tagging tendency in training data, in selection processing described below. Note that the storage unit 14 may be configured to communicate with the control unit 15 via the communication control unit 13.

The control unit 15 is realized using a CPU (Central Processing Unit) or the like, and executes a processing program stored in a memory. As a result, as illustrated in FIG. 4, the control unit 15 function as a calculation unit 15a, a selection unit 15b, a learning unit 15c, an addition unit 15d, and an extraction unit 15e.

Note that these functional units may be respectively implemented on different pieces of hardware, or some of these functional units may be implemented on a different piece of hardware. For example, the extraction unit 15e may be implemented on a piece of hardware that is different from the piece of hardware on which the calculation unit 15a, the selection unit 15b, the learning unit 15c, and the addition unit 15d are implemented.

In addition, the addition unit 15d may be implemented on a piece of hardware that is different from the piece of hardware on which the calculation unit 15a, the selection unit 15b, and the learning unit 15c are implemented. That is to say, although the present embodiment describes a case in which the selection apparatus carries out both the learning phase and the test phase, the learning phase and the test phase may be carried out by separate apparatuses.

The calculation unit 15a calculates the degree of association between the words included in compound word candidates that are each constituted by consecutive words in a document.

Here, a compound word is composed of a plurality of words that are closely associated with each other and that are consecutive in a document. For example, examples of compound words include "sābisukanyūsya", which is composed of consecutive nouns "sābisu", "kanyū", and "sya", and "hakkozi", which is composed of consecutive nouns "hatu", "ko", and "zi".

Note that words that constitute a compound word are not limited to nouns. For example, a compound word may be a word that is composed of words that are consecutive and are assigned to different parts of speech in a document, such as "yūzanozyōhō", which is composed of a noun "yūza", a particle "no", and a noun "zyōhō".

The calculation unit 15a selects a plurality of sets of words that are consecutive in a document, as compound word candidates. The calculation unit 15a calculates the degree of association between the words included in each compound word candidate. The selection unit 15b described below selects a compound word candidate whose degree of association between consecutive words is high as a compound word from among the compound word candidates.

Specifically, the calculation unit 15a divides a document input via the input unit 11 or the communication control unit 13 into words through morphological analysis. Thereafter, the calculation unit 15a selects sets of words that are consecutive in the document, as compound word candidates.

Also, the calculation unit 15a calculates the degree of association between the words included in compound word candidates. For example, the calculation unit 15a calculates the degree of association by using a conditional probability that is the probability of a word that precedes the last word being present in the document under the condition that the last word follows.

Figure 5:
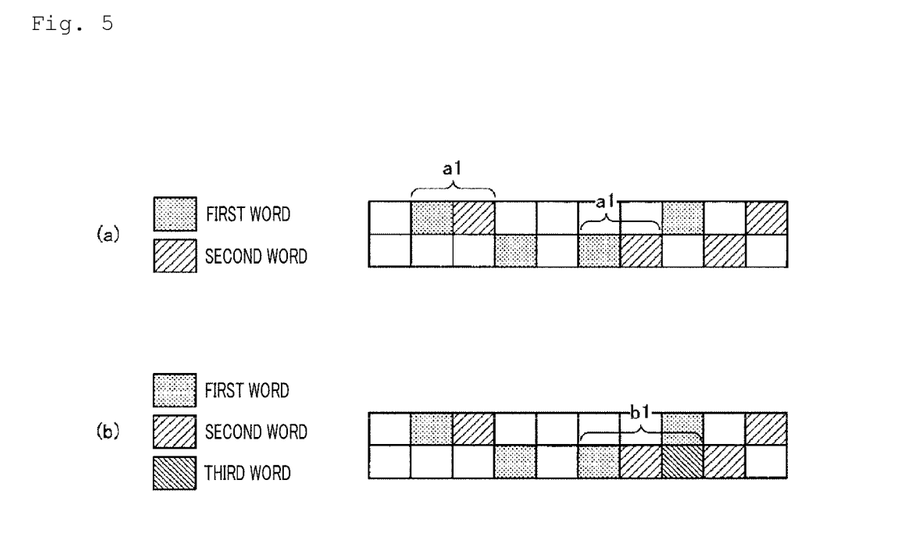
FIG. 5 is a diagram illustrating processing performed by a calculation unit.

Here, FIG. 5 is a diagram illustrating the processing performed by the calculation unit 15a. For example, as indicated by a1 in FIG. 5(a), the probability of a compound word candidate that is composed of two consecutive words being present is expressed as a conditional probability p(y|x) that is the probability of the first word y being present under a precondition x that the second word follows the first word.

In such a case, the degree of association between two words is expressed as the conditional probability p(y|x). Alternatively, the degree of association between two words may be expressed as pointwise mutual information PMI(x,y) as indicated by Formula (1) shown below.

[Formula 1]

$$PMI(x, y) = \log \frac{P(x, y)}{P(x)P(y)} \quad (1)$$

The above Formula (1) can be transformed into Formula (2) shown below, using p(y|x).

[Formula 2]

$$PMI(x, y) = \\ \log \frac{P(x, y)}{P(x)P(y)} = \log \frac{P(x)P(y \mid x)}{P(x)P(y)} = \log \frac{P(y \mid x)}{P(y)} = \log P(y \mid x) - \log P(y) \quad (2)$$

Here, an amount of information $I_i$ expressed by Formula (3) shown below is defined.

[Formula 3]

$$I_i = \log \frac{1}{P_i} [\text{bit}] = -\log P_i [\text{bit}] \quad (3)$$

The above Formula (2) can be transformed into Formula (4) shown below.

[Formula 4]

$$PMI(x,y) = -\log P(y) - \{-\log P(y|x)\} \quad (4)$$

That is to say, the above Formula (4) indicates that PMI(x,y) is obtained by subtracting the amount of information when x and y co-occur from the amount of information generated by y alone. In other words, the fact that the pointwise mutual information PMI(x,y) is large means that the amount of information when x and y co-occur is small, i.e., the probability of x and y co-occurring is high. Therefore, it can be seen that selecting the word y with a pointwise mutual information PMI(x,y) as the feature of a compound word is effective for performing learning related to x.

In this way, the degree of association $P_2$ between two words is calculated for the compound word candidates indicated by a1 in FIG. 5(a), each including two words, using the conditional probability p(y|x) or the above formula (4) in which the conditional probability p(y|x) is used.

Also, as indicated by b1 in FIG. 5(b), the probability of a compound word candidate that consists of three consecutive words being present is expressed as a conditional probability p(y|x), which is the probability of the compound word candidate y indicated by a1 in the above-described FIG. 5(a), composed of two consecutive words, being present under the precondition x that the third word follows them.

In this case, the degree of association $P_3$ of three words included in the compound word candidate that is composed of the three words is calculated through p(y|x) or the above formula (4).

Similarly, the degree of association $P_n$ of n words included in a compound word candidate that is composed of n consecutive words is calculated through p(y|x) or the above Formula (4).

The selection unit 15b selects, as a compound word, a compound word candidate whose degree of association thus calculated is higher than a predetermined threshold value. For example, when the degree of association $P_2$ calculated for a compound word candidate that is composed of two consecutive words is higher than the predetermined threshold value, the selection unit 15b selects the compound word candidate as a compound word.

Also, when three or more words are consecutive in a document, the selection unit 15b selects, as a compound word, the compound word candidate with the highest degree of association among degrees of association respectively calculated for compound word candidates that are each constituted by a given number of consecutive words.

For example, when compared with the degree of association $P_3$ calculated for a compound word candidate that is composed of three consecutive words in a document, if the degree of association $P_2$ of the preceding two words is higher, the selection unit 15b selects the compound word candidate that is composed of the two words corresponding to $P_2$ as a compound word.

When n words, where n is four or more, are consecutive in a document, and $P_3 > P_n > P_2$ is satisfied, for example, the selection unit 15b selects a compound word candidate that is composed of the three consecutive words corresponding to $P_3$ as a compound word.

Thus, the selection unit 15b can select words that are closely associated with each other and that are consecutive in a document from among compound words, as a compound word.

The learning unit 15c learns a positional relationship between words that include the selected compound word in the document and predetermined tags added to the document.

Here, predetermined tags corresponding to descriptions are added to the document. For example, in a design document, tags such as "Agent", "Input", "Input condition", "Condition", "Output", "Output condition", and "Check point", which indicate defined requirements, are added.

"Agent" indicates a target system. "Input" indicates input information to the system. "Input condition" indicates an input condition. "Condition" indicates a system condition. "Output" indicates output information from the system. "Output condition" indicates an output condition. "Check point" indicates a check point or a check item.

Here, the learning unit 15c learns training data to learn a positional relationship between words that include the compound words in the document and the predetermined tags added to the document. For example, the learning unit 15c learns positional relationships between words that include a compound word such as "sābisukanyūsya" or "hakkozi" and tags that indicate the fact that requirements are described therein.

Thus, the learning unit 15c learns the tagging of the predetermined tags to important description portions in the document such as portions where the requirements of a design document are described, which are specified using words that include compound words. The learning unit 15c creates a model that indicates at least the relationship between the positions of words that include compound words in the document and the positions of the predetermined tags as the result of learning, and stores the model in the storage unit 14. Note that this model may be trained using features such as the frequency of appearance of words and the types of the tags as well. The learning method is not particularly limited, and any known technology may be adopted.

In this way, the learning unit 15c can accurately specify description portions to which tags are to be added to a document, by using compound words. Therefore, the learning unit 15c can accurately learn the tagging to the specified description portions. In other words, by performing machine learning using compound words, the learning unit 15c can improve accuracy in learning the positions to which predetermined tags are added to a document.

The addition unit 15d adds predetermined tags in a document based on the positional relationship between words that include compound words that have been learned in a document and the predetermined tags added to the document. Specifically, in the test phase, the addition unit 15d references the result of learning obtained in the learning phase, stored in the storage unit 14, and adds predetermined tags to the test data that may include compound words, according to the result of learning.

For example, the addition unit 15d inputs, to a model that has been generated by the learning unit 15c and indicate the relationship between the positions of words the include compound words in the document and the positions to which the predetermined tags are added, a word that include a compound word in the test data and the position of the word, to obtain the predetermined tag and the position to which the tag is added. Thus, the addition unit 15d can add the predetermined tag to the test data.

In this way, by using compound words, the addition unit 15d can specify description portions to which tags are to be added, and can add predetermined tags to the specified description portions. Thus, the addition unit 15d can accurately add tags to appropriate portions of the test data.

The extraction unit 15e extracts test items from test data to which tags have been added. For example, extraction unit 15e references tags that have been appropriately added by the addition unit 15d to important description portions in a document such as requirements of a development design document. Then, the extraction unit 15e automatically extracts test items from the portions indicated by the tags, using statistical information regarding tests conducted on the same or similar portions. As a result, the extraction unit 15e can automatically extract appropriate test items from test data written in a natural language.

[Selection Processing]

Figure 6:
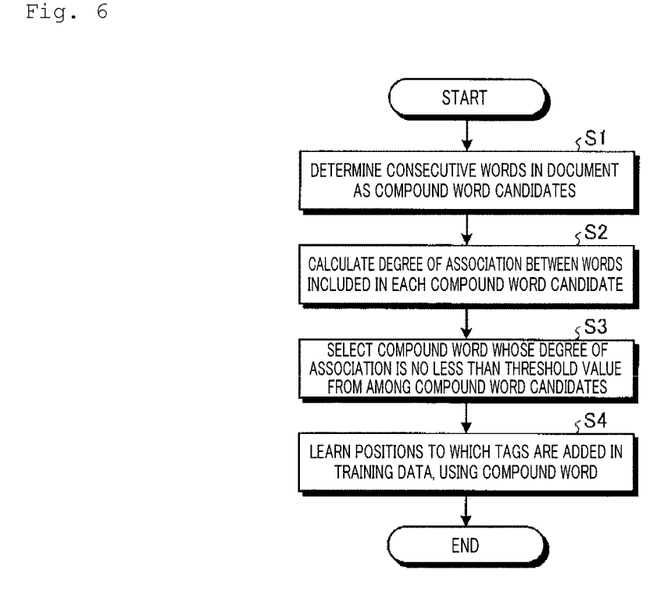
FIG. 6 is a flowchart showing selection processing procedures in a learning phase.

Next, selection processing performed by the selection apparatus 10 according to the present embodiment will be described with reference to FIGS. 6 and 7. FIG. 6 is a flowchart showing selection processing procedures in the learning phase. The flowchart in FIG. 6 is started upon a user performing an operation to input a start instruction.

First, the calculation unit 15a selects sets of words that are consecutive in a document, as compound word candidates (step S1). Next, the calculation unit 15a calculates the degree of association between words included in compound word candidates (step S2).

For example, the calculation unit 15a calculates the degree of association by using the conditional probability $P(y|x)$, which is the probability of the word y that precedes the last word being present in the document, under the condition x that the last word follows. Here, the degree of association is the conditional probability $p(y|x)$ or the pointwise mutual information $PMI(x,y)$ expressed by the above Formula (4).

Next, the selection unit 15b selects, as a compound word, a compound word candidate whose degree of association thus calculated is higher than a predetermined threshold value (step S3). Also, when three or more words are consecutive in a document, the selection unit 15b selects, as a compound word, the compound word candidate with the highest degree of association among degrees of association respectively calculated for compound word candidates that are each constituted by a given number of consecutive words.

For example, when n words are consecutive in the document and $P_3$ is the highest of the respective degrees of association $P_2, P_3, \ldots,$ and $P_n$ of the compound words that are each constituted by a given number of words, the selection unit 15b selects the compound word candidate that is composed of three consecutive words, as a compound word.

Next, the learning unit 15c learns the positions to which predetermined tags are added to the document, using the selected compound word (step S4). That is to say, in the learning phase, regarding training data, the learning unit 15c learns a positional relationship between words that include the selected compound word in the document and the predetermined tags added to the document. The learning unit 15c creates a model that indicates the relationship between the positions of words that include compound words in the document and the positions of the predetermined tags as the result of learning, and stores the model in the storage unit 14.

Figure 7:
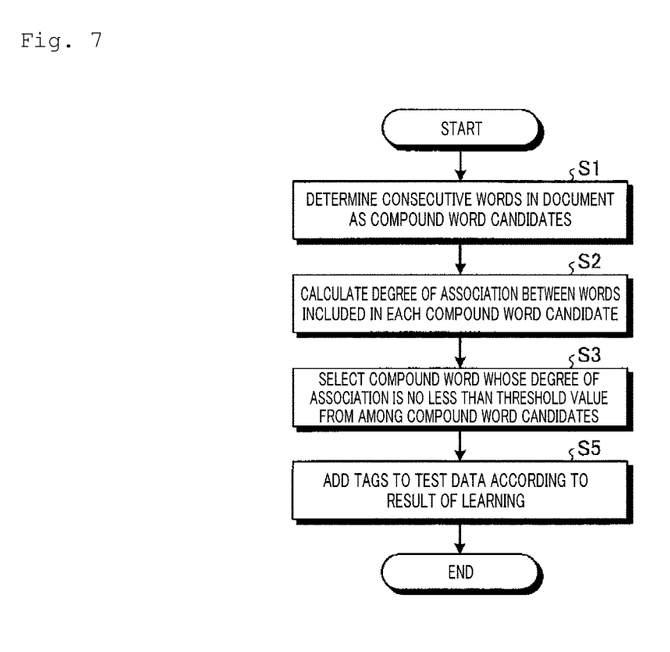
FIG. 7 is a flowchart showing selection processing procedures in a test phase.

FIG. 7 is a flowchart showing selection processing procedures in the test phase. In the processing in FIG. 7, the processing in steps S1 to S3 is the same as that shown in FIG. 6. Therefore, a description thereof is omitted. Note that the processing in steps S1 to S3 may be omitted in the test phase.

In the processing in step S5, the addition unit 15d adds tags to the test data according to the result of learning performed in the learning phase using the compound word. That is to say, the addition unit 15d adds predetermined tags to the test data base on the positional relationship between words that include the compound word in the document and the predetermined tags added to the document, which are the results of learning obtained in the learning phase shown in FIG. 6. For example, the addition unit 15d references the storage unit 14, inputs words that include the compound word in the test data and the positions thereof to the model created by the learning unit 15c, and obtain predetermined tags and positions to which the tags are to be added.

Thus, the series of selection processing is complete. As a result, the selection apparatus 10 accurately adds tags to appropriate portions in the test data. Thereafter, the extraction unit 15e extracts test items from the test data to which tags have been appropriately added, by using statistical information regarding tests conducted on portions that are the same as, or similar to, the portions indicated by the tags.

As described above, in the selection apparatus 10 according to the present embodiment, the calculation unit 15a calculates the degree of association between words included in compound word candidates that are consecutive words in a document. The selection unit 15b selects, as a compound word, a compound word candidate whose degree of association thus calculated is higher than a predetermined threshold value. The learning unit 15c learns a positional relationship between words that include the selected compound word in the document and predetermined tags added to the document. The addition unit 15d adds predetermined tags in a document based on the positional relationship between words that include compound words that have been learned in a document and the predetermined tags added to the document.

As a result, the selection apparatus 10 can appropriately select words that are closely associated with each other and that are consecutive in a document, as a compound word, and accurately specify a description portion to which a tag is to be added to a document, using the selected compound word. Therefore, the selection apparatus 10 can accurately learn the tendency of tagging positions regarding the training data.

Also, based on the positional relationship between words that include a compound word in the training data that is the result of learning and predetermined tags added to the training data, the selection apparatus 10 can accurately specify the description portions in the document to which tags are to be added, and add the predetermined tags to the test data that may include the compound word. In this way, the selection apparatus 10 can learn positions to which tags are added, using an appropriately selected compound word, and add tags to appropriate portions of test data written in a natural language.

Also, as a result, the extraction unit 15e can accurately extract appropriate test items with reference to the tags added to appropriate portions of the test data, by using statistical information regarding tests conducted on portions that are the same as, or similar to, the portions indicated by the tags. In this way, in the selection apparatus 10, the extraction unit 15e can automatically extract appropriate test items from test data written in a natural language.

Also, the calculation unit 15a calculates the degree of association by using the conditional probability p(y|x), which is the probability of the word y that precedes the last word being present in the document, under the condition x that the last word follows. In this way, the selection apparatus 10 can appropriately select words that are associated with each other and are consecutive in a document, as a compound word.

Also, when three or more words are consecutive in a document, the selection unit 15b selects, as a compound word, the compound word candidate with the highest degree of association among degrees of association respectively calculated for compound word candidates that are each constituted by a given number of consecutive words. As a result, the selection apparatus 10 can select more appropriate compound word, and more accurately perform machine learning regarding tagging.

[Program]

It is also possible to create a program that describes the processing executed by the selection apparatus 10 according to the above-described embodiment, in a computer-executable language. In one embodiment, the selection apparatus 10 can be implemented by installing a selection program that executes the above-described selection processing, as packaged software or online software, on a desired computer. For example, by causing an information processing apparatus to execute the above-described selection program, it is possible to enable the information processing apparatus to function as the selection apparatus 10. The information processing apparatus mentioned here may be a desktop or a laptop personal computer. In addition, the scope of the information processing apparatus also includes mobile communication terminals such as a smartphone, a mobile phone, and a PHS (Personal Handyphone System), and slate terminals such as a PDA (Personal Digital Assistant), for example. Also, the functions of the selection apparatus 10 may be implemented on a cloud server.

Figure 8:
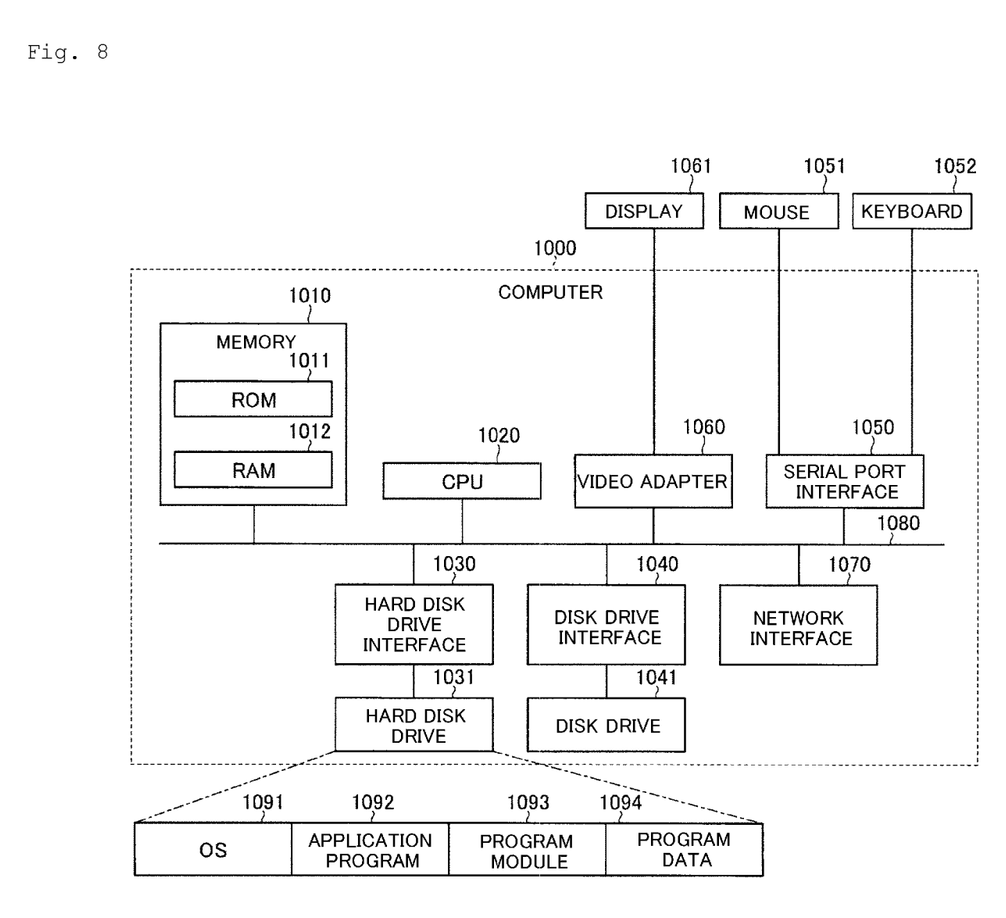
FIG. 8 is a diagram showing an example of a computer that executes a selection program.

FIG. 8 is a diagram showing an example of a computer that executes the selection program. A computer 1000 includes, for example, a memory 1010, a CPU 1020, a hard disk drive interface 1030, a disk drive interface 1040, a serial port interface 1050, a video adapter 1060, and a network interface 1070. These units are connected via a bus 1080.

The memory 1010 includes a ROM (Read Only Memory) 1011 and a RAM 1012. The ROM 1011 stores a boot program such as a BIOS (Basic Input Output System) program, for example. The hard disk drive interface 1030 is connected to a hard disk drive 1031. The disk drive interface 1040 is connected to a disk drive 1041. For example, a removable storage medium such as a magnetic disk or an optical disc is inserted into the disk drive 1041. The serial port interface 1050 is connected to a mouse 1051 and a keyboard 1052, for example. The video adapter 1060 is connected to a display 1061, for example.

The hard disk drive 1031 stores an OS 1091, an application program 1092, a program module 1093, and program data 1094, for example. The various kinds of information described in the above embodiment are stored in the hard disk drive 1031 or the memory 1010, for example.

The selection program is stored on the hard disk drive 1031 as the program module 1093 in which instructions to be executed by the computer 1000 are written, for example. Specifically, the program module 1093 in which each kind of processing to be executed by the selection apparatus 10 described in the above embodiment is stored on the hard disk drive 1031.

Data used in the information processing performed by the selection program is stored on the hard disk drive 1031 as the program data 1094, for example. The CPU 1020 reads out the program module 1093 or the program data 1094 stored on the hard disk drive 1031 to the RAM 1012 as necessary, and executes the above-described procedures.

Note that the program module 1093 and the program data 1094 pertaining to the selection program are not limited to being stored on the hard disk drive 1031, and may be stored on a removable storage medium, for example, and read out by the CPU 1020 via the disk drive 1041 or the like. Alternatively, the program module 1093 and the program data 1094 pertaining to the selection program may be stored in another computer connected via a network such as a LAN (Local Area Network) or a WAN (Wide Area Network), and read out by the CPU 1020 via the network interface 1070.

An embodiment to which the invention made by the inventors is applied has been described above. However, the present invention is not limited by the descriptions or the drawings according to the present embodiment that constitute a part of the disclosure of the present invention. That is to say, other embodiments, examples, operational technologies, and so on that can be realized based on the present embodiment, by a person skilled in the art or the like, are all included in the scope of the present invention.

REFERENCE SIGNS LIST

1 Document
3 Learning result
10 Selection apparatus
11 Input unit
12 Output unit
13 Communication control unit
14 Storage unit
15 Control unit
15a Calculation unit
15b Selection unit
15c Learning unit
15d Addition unit
15e Extraction unit

The invention claimed is:

1. A selection apparatus comprising:
a calculation unit, including one or more processors, configured to:
receive a document that includes a plurality of words;
select compound word candidates as a subset of consecutive words from the plurality of words in the document;
calculate a degree of association between each of the words included in the compound word candidates;
a selection unit, including one or more processors, configured to:
select, as a compound word, a compound word candidate from the compound word candidates based on a corresponding degree of association that satisfies a predetermined threshold value;
a learning unit, including one or more processors, configured to:
generate training data that comprises a positional relationship between the words of the selected compound word in the document and predetermined tags added to the document;
train a machine learning model using the generated training data, wherein the machine learning model is trained to identify portions of other documents to which one or more predetermined tags are to be added; and
an addition unit, including one or more processors, configured to:
input, to the trained machine learning model, test data that comprises a compound word and a position of the word in another document; and
obtain, from the trained machine learning model, data indicative of a predetermined tag and a position to which to add the predetermined tag to the other document.

2. The selection apparatus according to claim 1, wherein the calculation unit is configured to calculate the degree of association by using a conditional probability that represents a probability of a word that precedes a last word being present in the document under a condition that the last word follows.

3. The selection apparatus according to claim 1, wherein, in response to the calculation unit selecting three or more words consecutive in the document, the selection unit is configured to select, as a first compound word, a first compound word candidate with the highest degree of association among degrees of association respectively calculated for the compound word candidates that are each constituted by a given number of consecutive words.

4. The selection apparatus according to claim 1, wherein the extraction unit is configured to extract test items from the test data according to the data indicative of the predetermined tag and the position to which the predetermined tag was added to the other documents.

5. the selection apparatus according to claim 1, wherein the one or more predetermined tags indicate requirements described in the document.

6. A selection method carried out by a selection apparatus, comprising:
receiving a document that includes a plurality of words;
selecting compound word candidates as a subset of consecutive words from the plurality of words in the document;
calculating a degree of association between each of the words included in the compound word candidates;
selecting, as a compound word, a compound word candidate from the compound word candidates based on a corresponding degree of association that satisfies a predetermined threshold value;
generate training data that comprises a positional relationship between the words of the selected compound word in the document and predetermined tags added to the document;
training a machine learning model using the generated training data, wherein the machine learning model is trained to identify portions of other documents to which one or more predetermined tags are to be added;
inputting, to the trained machine learning model, test data that comprises a compound word and a position of the word in another document and
obtaining, from the trained machine learning model, data indicative of a predetermined tag and a position to which to add the predetermined tag to the other document.

* * * * *